United States Patent [19]

Neilson

[11] 4,134,217
[45] Jan. 16, 1979

[54] OMEGA SIMULATION

[75] Inventor: Scott B. Neilson, Kensington, Md.

[73] Assignee: The Singer Company, Binghamton, N.Y.

[21] Appl. No.: 776,775

[22] Filed: Mar. 11, 1977

[51] Int. Cl.² ............... G01C 21/00; G09B 9/08
[52] U.S. Cl. ................... 35/10.2; 35/12 R; 364/578; 343/105 R; 35/10.4
[58] Field of Search .......... 35/10.2, 12 R, 12 N, 35/12 W; 343/105; 364/578

[56] References Cited

U.S. PATENT DOCUMENTS

| 3,665,086 | 5/1972 | Magee et al. | 35/10.2 |
| 3,885,323 | 5/1975 | Kaase et al. | 35/10.4 |

OTHER PUBLICATIONS

Stephenson et al., Navigation Training Simulators, Navigation, Journal of the Institute of Navigation, vol. 19, No. 3, 1972.

Primary Examiner—Felix D. Gruber
Attorney, Agent, or Firm—Ronald Reichman; Jeffrey Rothenberg

[57] ABSTRACT

This invention is a system for teaching the principles of Omega navigation and the operation of Omega receivers, which system comprises a simulation computer that provides to an Omega interface (which acts as an Omega receiver) the appropriate Omega signals to simultaneously represent a plurality of Omega transmitters, and an on-board computer that is stimulated by the formatted output of the Omega interface. A student may enter the location of his vehicle into the on-board computer and observe the positional change of his vehicle as the Omega interface receiver is updated with simulated Omega transmissions.

6 Claims, 22 Drawing Figures

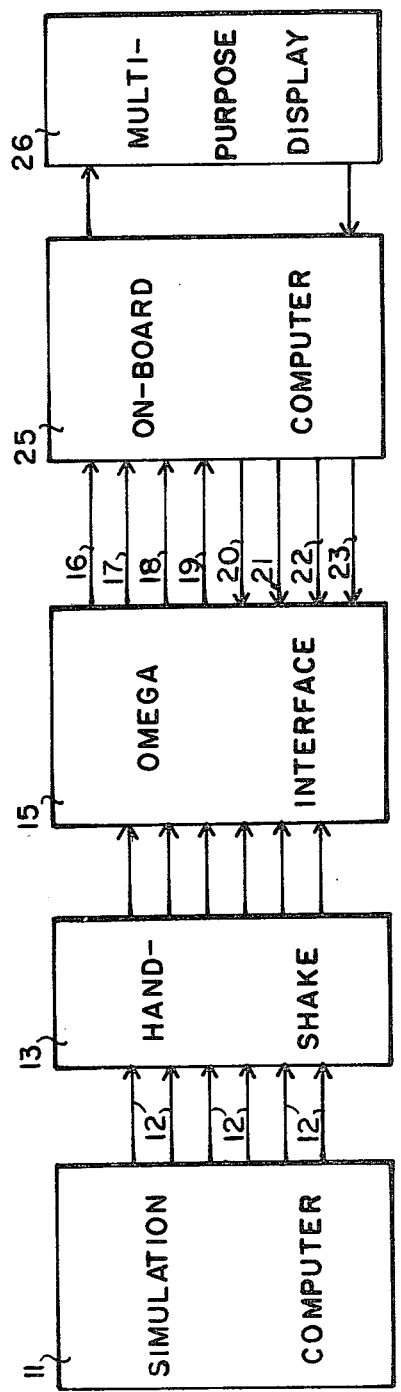

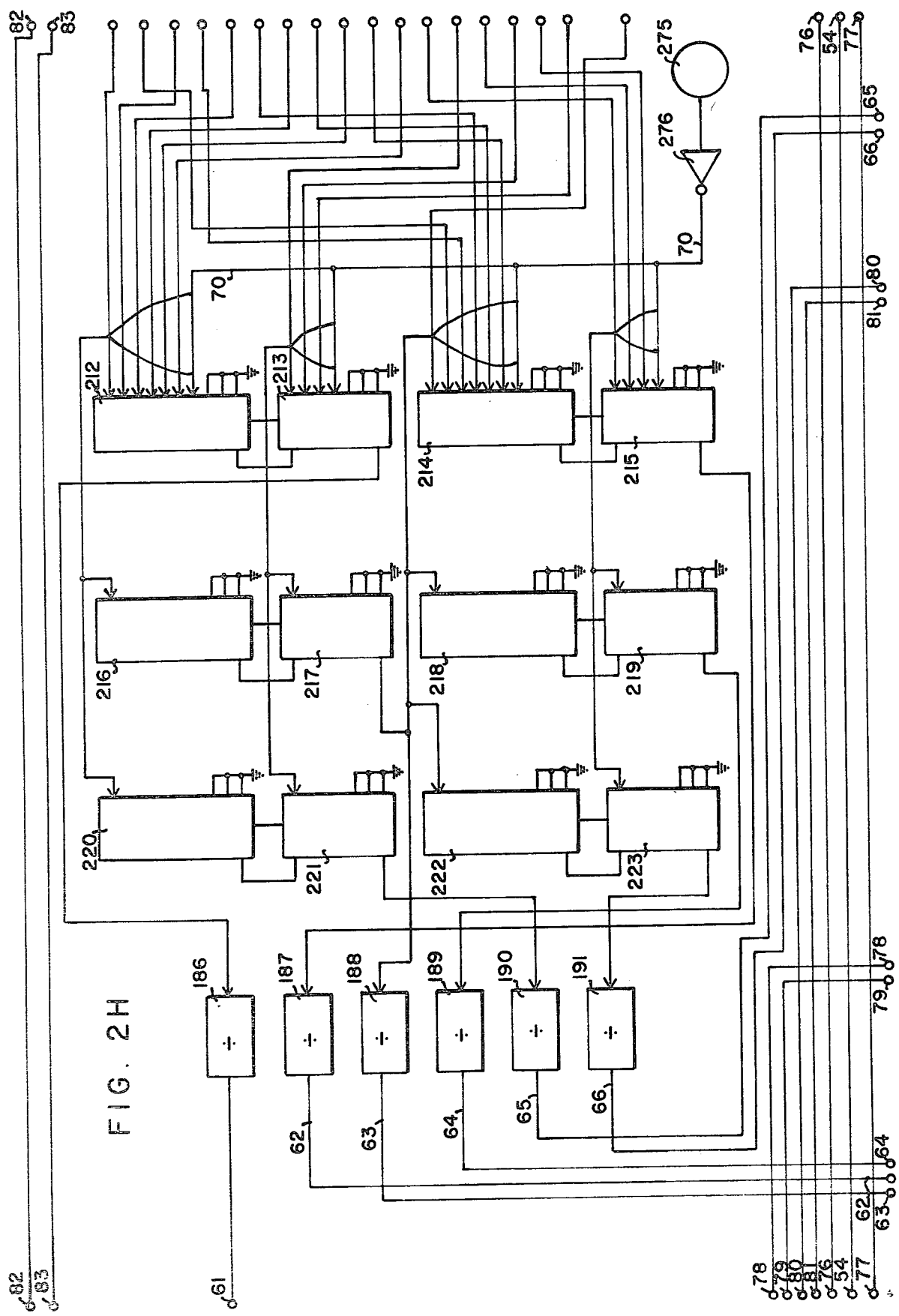

OMEGA SIMULATION

The United States Government has rights in this invention pursuant to Contract Number N61339-73-C-0154 awarded by the Department of the Navy.

BACKGROUND OF THE INVENTION

1. Field of the Invention

This invention relates to training devices and, more particularly, to devices for teaching navigational skills.

2. Description of the Prior Art

For centuries man has navigated by the stars and the sun. However, with the increase in the speed of modern vehicles and with the great expansion of modern travel, more accurate methods of navigation have been required. One of the newer navigational systems is the Omega system which is a long-range hyperbolic navigation system that transmits interrupted continuous wave signals from which phase differences are extracted.

Omega is a radio navigation system employing very low frequency electromagnetic signals which will provide relatively accurate positional information to navigational users on a world-wide basis. This system somewhat resembles other radio navigational systems such as Loran and Decca but differs in a number of important ways. Omega operates at a much lower frequency than does Loran and its position fixing technique utilizes phase differences rather than time differences.

The complete Omega system will consist of eight transmitting stations distributed more or less uniformly over the globe. The primary navigational signal is transmitted at a frequency of 10.2 kHz and a power level of 10 kW. The transmissions from each station are synchronized (to a common reference), unmodulated continuous wave signals which are time-shared within a ten-second interval. Outside a 1,000 km radius (near field) zone, each transmitter radiates a stable signal pattern which is repeated in a radial direction at approximately 30 km segments from the station. These repeated segments, or wave lengths, thus provide a measure of great circle distances and contain a complete cycle of phase which is measured in radians or degrees. The cumulative phase is the total intervening phase between a transmitter and an observation point and hence is approximately proportional to the corresponding great circle distance. In practice, the reference oscillator of an Omega receiver will not ordinarily provide the timing of the time sequenced transmission burst and hence only the fractional portion of the range in wave length units is known. The remaining distance which corresponds to an integral number of wave lengths must be determined by external means. In order that a user's receiver be simple and inexpensive, the system is customarily used in a hyperbolic mode. In this mode, signals from a pair of transmitters are compared to an internal oscillator not time synchronized to the transmitter and a phase difference is measured. The locus of geographic positions which gives rise to the same phase difference with respect to two transmitters is a closed curve on the earth's surface. Clearly, two such curves, referred to as lines of position, obtained from three or four transmitters will establish a position fix. Since the calculation of these lines of position is somewhat involved, charts have been prepared for large areas of the world. Three charts show lines of position latices corresponding to several transmitter pairs and are plotted in sufficient detail such that accurate interpolation can be made.

Simulators have been used as training devices in many situations, but they have a special place in dangerous or potentially dangerous situations. A simulator which is to be used for training is constructed to simulate the operation of a device in real time. That is, the simulator must produce the same effects in the same time that the actual device being simulated does. Thus, simulators have been invented to teach students how to use and operate various types of equipment without undergoing the dangers that are inherent in the equipments' actual operation. For instance, it is a great deal safer to learn how to navigate an aircraft on the ground than to get lost in the air in an acutal aircraft.

SUMMARY OF THE INVENTION

The purpose of this invention is to provide for simulation of Omega navigation equipment so that students may be taught to accurately read and enter information into the Omega equipment, to navigate aircraft and ships, etc., over the face of the earth. The student reads on the simulated navigational instruments and determines what information he will enter into the simulated Omega navigational equipment by means of a multipurpose keyboard. Thereupon, the simulated navigational equipment processes the entered information and displays certain information on a multipurpose display to permit the student to read the displayed information and determine the heading of his vehicle so that he may navigate his vehicle from one point to another.

The simulated Omega navigation equipment comprises a computer program which is contained in a simulation computer for simulating the individual Omega stations, a hardware interface which simulates the data handling functions of the Omega receiver, an on-board computer that receives the same information that the real on-board computer would receive, and a multipurpose display where relevant information is entered and displayed. The three Omega station signals that are generated are phase-locked and time-synchronized to a repetitive ten-second transmission pattern. In the Omega system, the relevant information that one is looking for is contained in the phase of the received signal. The hardware interface simulates the actual Omega receiver. The simulation computer program causes the simulation computer to generate only those signals required by the on-board computer. The aforementioned computer program computes the ground wave and sky wave propagation delays from each Omega station to the navigating device by performing great circle calculations. From this, the ground wave and sky wave ranges are determined and converted into wave lengths relative to each transmitted frequency. Thereupon, the phase of each signal is computed and the sin and cosine of each frequency for that phase angle is output to the simulation interface.

The simulation interface serves the function of mating the simulation computer with the on-board computer of the navigating device. It rearranges the six 16-bit word parallel output from the simulation computer into three 32-bit words. These three words contain two types of information depending on the information requested by the on-board computer. The first type of information transferred is sin and cosine phase angle data. The second type is receiver test information. Receiver testing is continuously being performed between data receptions in order to reduce the chances of receiver phase error. Since the receiver does not exist in the Omega simulation, the interface performs the task of sending the on-board computer the requested test data. The on-board computer processes the incoming data and displays the up-dated geographical position on a multipurpose display.

It is an object of this invention to provide a new and improved system for simulating navigational systems.

It is another object of this invention to provide a new and improved system for simulating Omega navigational equipment.

It is a further object of this invention to provide a new and improved simulated Omega navigational device for training students to navigate vehicles from one place to another.

Other objects and advantages of this invention will become apparent as the following description proceeds, which description should be considered together with the accompanying drawings.

BRIEF DESCRIPTION OF THE DRAWINGS

FIG. 1 is a general overall block diagram of the system that comprises this invention.

FIG. 2 is a matrix showing how FIGS. 2A through 2I are assembled to form a complete drawing.

FIGS. 2A through 2I are logic diagrams of the electrical system that comprises this invention.

DESCRIPTION OF A PREFERRED EMBODIMENT

Figure 2A:
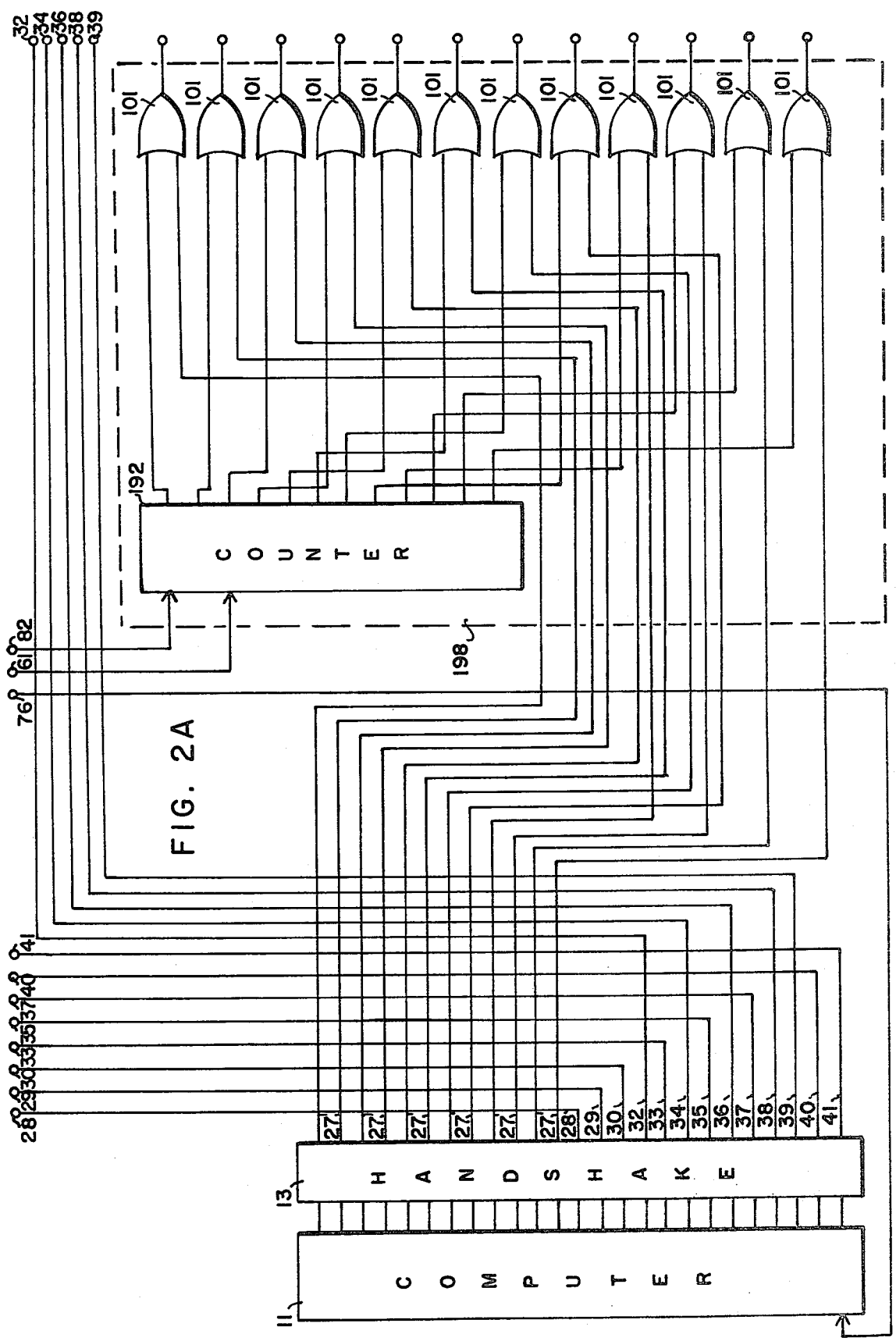

Referring now to the drawings in detail and, more particularly, to FIG. 1, the reference character 11 represents a simulation computer that generates the three Omega stations' navigational signals that would be picked up by an Omega receiver which is in the location of those three stations. There are eight Omega stations. However, from any location on the earth's surface, only three stations transmit in a given time period. The output of computer 11 is six 16-bit data words (however, not all 16 bits are used). Each 16-bit data word is transmitted on one of the six lines 12 to handshake 13. Handshake 13 will make the signals that it receives from computer 11 electrically compatible with the input of Omega interface 15. Omega interface 15 receives information from handshake 13 and formats the six 16-bit data words into three 32-bit word serial words which are compatible with and transmitted to on-board computer 25 via line 16. Interface 15 is also responsible for generating the necessary test data which may be requested by the on-board computer 25. Data transfer between the Omega interface 15 and the on-board computer 25 takes place on a request/acknowledge basis. The three 32-bit data words are transferred every 50 milliseconds upon demand from the on-board computer. If the on-board computer 25 sets line 20, the external interrupt enable line, high, computer 25 will be requesting positional data; that is, sin/cosine data, from the simulation computer 11. The Omega interface 15 receives the aforementioned signal and acknowledges this fact to the on-board computer 25 by setting the external interrupt high which is transmitted on line 17 and thus transfers the first 32-bit word which contains the status of the last 50 millisecond data transfer via line 16 to on-board computer 25. If on-board computer 25 accepts the first word (status word only used when the system is first turned on), it acknowledges the transfer by setting the input acknowledge line 21 high. When Omega interface 15 receives the input acknowledge, it acknowledges this fact by setting the input data request, line 18, high and transfers the first 32-bit data word via line 16. The on-board computer 25 acknowledges the first data word transfer by setting line 21 high (input acknowledge). The Omega interface 15 acknowledges the input acknowledge signal by producing an input data request signal via line 18 and transferring the second 32-bit data word to on-board computer 25 via line 16. The on-board computer 25 acknowledges the second data word transfer by setting line 21 high (input acknowledge). The Omega interface 15 acknowledges the input acknowledge signal by producing an input data request signal via line 18 and transferring the third 32-bit data word to the on-board computer 25 via line 16. The aforegoing process continues until on-board computer 25 neglects to set external interrupt line 17 within a specified period of time.

Between the phase data transfer for each station is a 2/10-second time period during which the on-board computer 25 requests the receiver to perform specified tests. Since the receiver is not used in the simulation, the interface 15 must generate the test data. During the testing interval, Omega interface 15 generates a function request signal which is transmitted to computer 25 via line 19. This signal informs computer 25 that interface 15 is ready to receive test commands. Thereupon, at the convenience of computer 25, the test commands will be generated. The 32 data bits will be transmitted on line 23 when computer 25 generates and transmits an external function signal via line 22 indicating that the test commands are ready for sampling. The Omega interface 15 detects the signal transmitted on line 22 and uses this signal to clear line 19 and sample the test command. Interface 15 produces the proper test and transfers the test to the on-board computer 25 via lines 17 and 18. After the transfer of the test data, on-board computer 25 generates a signal called an external interrupt enable which is transmitted on line 20 and requests from interface 15 positional data from the next Omega station that is being simulated by simulation computer 11. The output of computer 25 is coupled to multipurpose display 26 where the output of computer 25 is visually displayed. Multipurpose display 26 has a keyboard whereby a student may enter information into computer 25.

Contained in FIG. 2A is the software program of simulation computer 11 which is used for continuously generating and up-dating Omega navigational data. The simulated navigational data that is generated is the same as that data produced by a real-world Omega station and is, therefore, based on a family of hyperbolic lines generated by eight strategically located transmitting stations which provide a world-wide frequency lattice within which a vehicle's position may be calculated. Each Omega station transmits a sequence of three frequency bursts (10.2 kHz, 11.33 kHz and 13.6 kHz) multiplexed so that only one station is transmitting one of the three frequencies at any one time. Each burst lasts for that segment of the time frame in which it is designated to be transmitted. The first frequency burst from any one station contains a 10.2 kHz signal, the second a 13.6 kHz signal and the third an 11.33 kHz signal. A two-tenths second delay between consecutive bursts is necessary to allow time for the station's transmission to decay. This decay eliminates a chance of reception interference caused by two stations transmitting the same frequency at the same time. After a station has transmitted its three frequencies for the time duration specified, that station will not transmit again until the next ten-second time frame. Each Omega station transmits for a different time duration relative to the stations transmitting before and after it. Station identification can easily be achieved by recognizing the format of each transmission frame. Thus, at an instant of time only three Omega stations' signals may be received. The output of computer 11 is six 16-bit words. Bits 0-11 of word one will contain simulated data which will be transmitted on line 27. Since the entire six words are similar in form, only the first word will be completely described in this description. Bits 0-11 and bits 13-15 of word two will be transmitted on line 32, and bits 0-11 and bits 13-15 of word three will be transmitted on line 34. Line 36 will transmit bits 0-11 and bits 13-15 of word four and line 38 will transmit bits 0-15 of word five. Bits 0-13 of word six will be transmitted on line 39. Bit 12 of word one will be transmitted on line 28, bit 14 of word one will be transmitted on line 29, and bit 15 of word one will be transmitted on line 30. Bit 12 of word two will be transmitted on line 33 and bit 12 of word three will be transmitted on line 35. Bit 12 of word four will be transmitted on line 37, bit 14 of word six on line 40 and bit 15 of word six will be transmitted on line 41. The entire six words are coupled to the input of handshake 13. Handshake 13 will make the output of computer 11 electrically compatible with the remainder of this system. Bits 0—11 of each of the six words represent data bits that contain information pertaining to the Omega stations being simulated. Block 198 (shown in dotted lines) represents an up-down counter 192 that has 12 outputs coupled to the inputs of a plurality of OR gates 101. Each output of counter 192 is coupled to a different OR gate. Blocks 193-197 (FIG. 2B) contain the same logic as block 198.

Figure 2B:
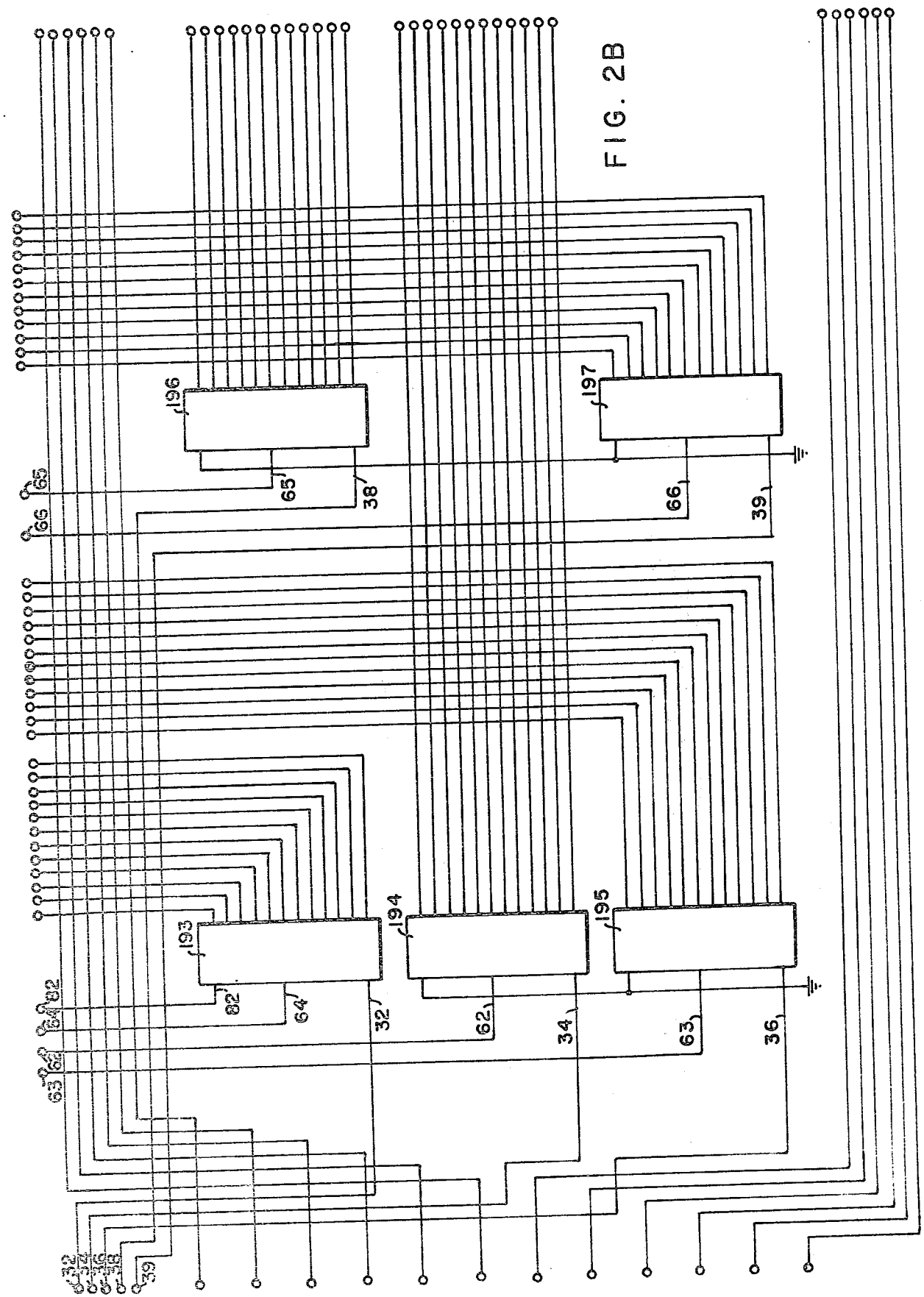
Figure 2C:
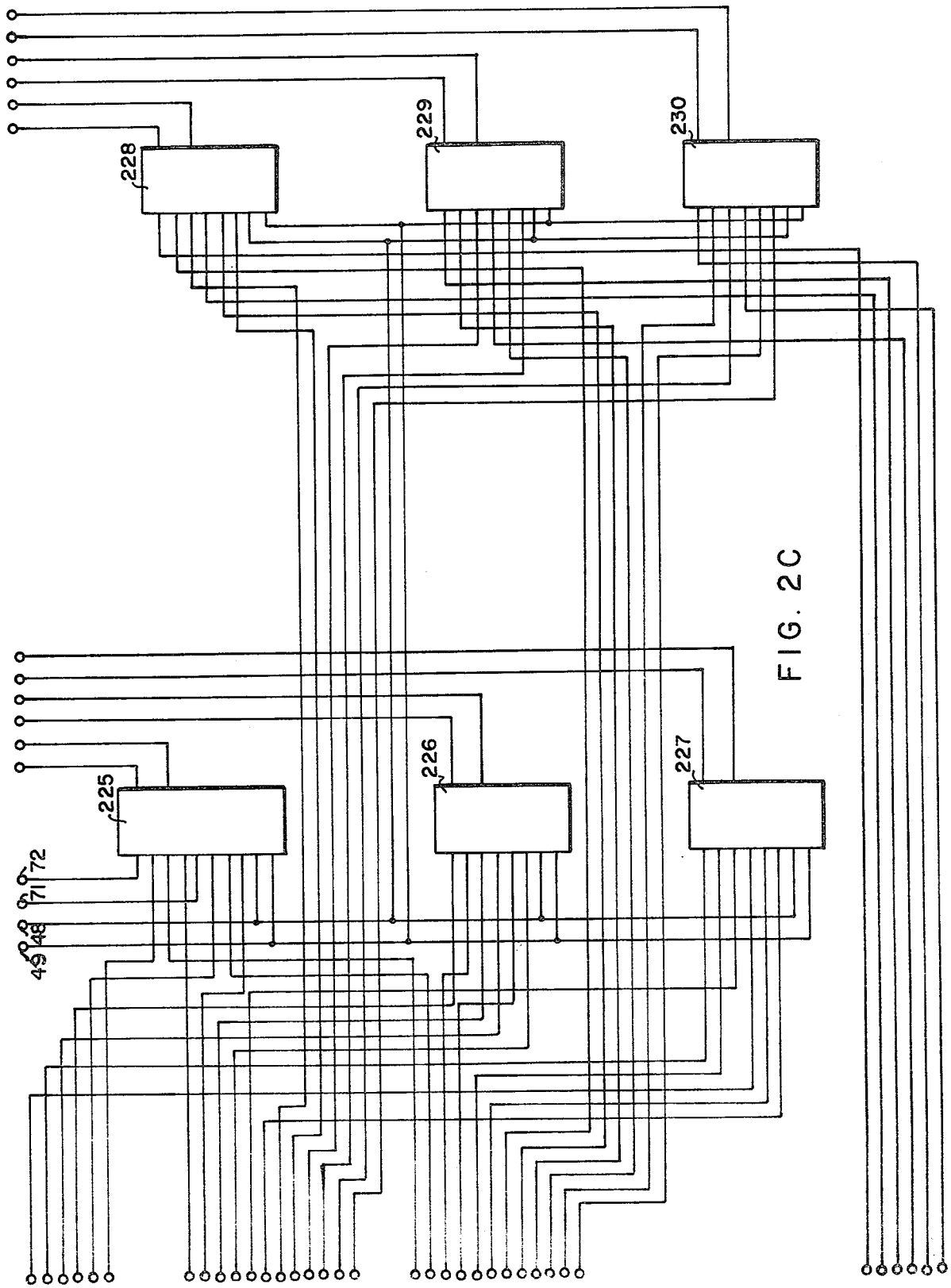
Figure 2D:
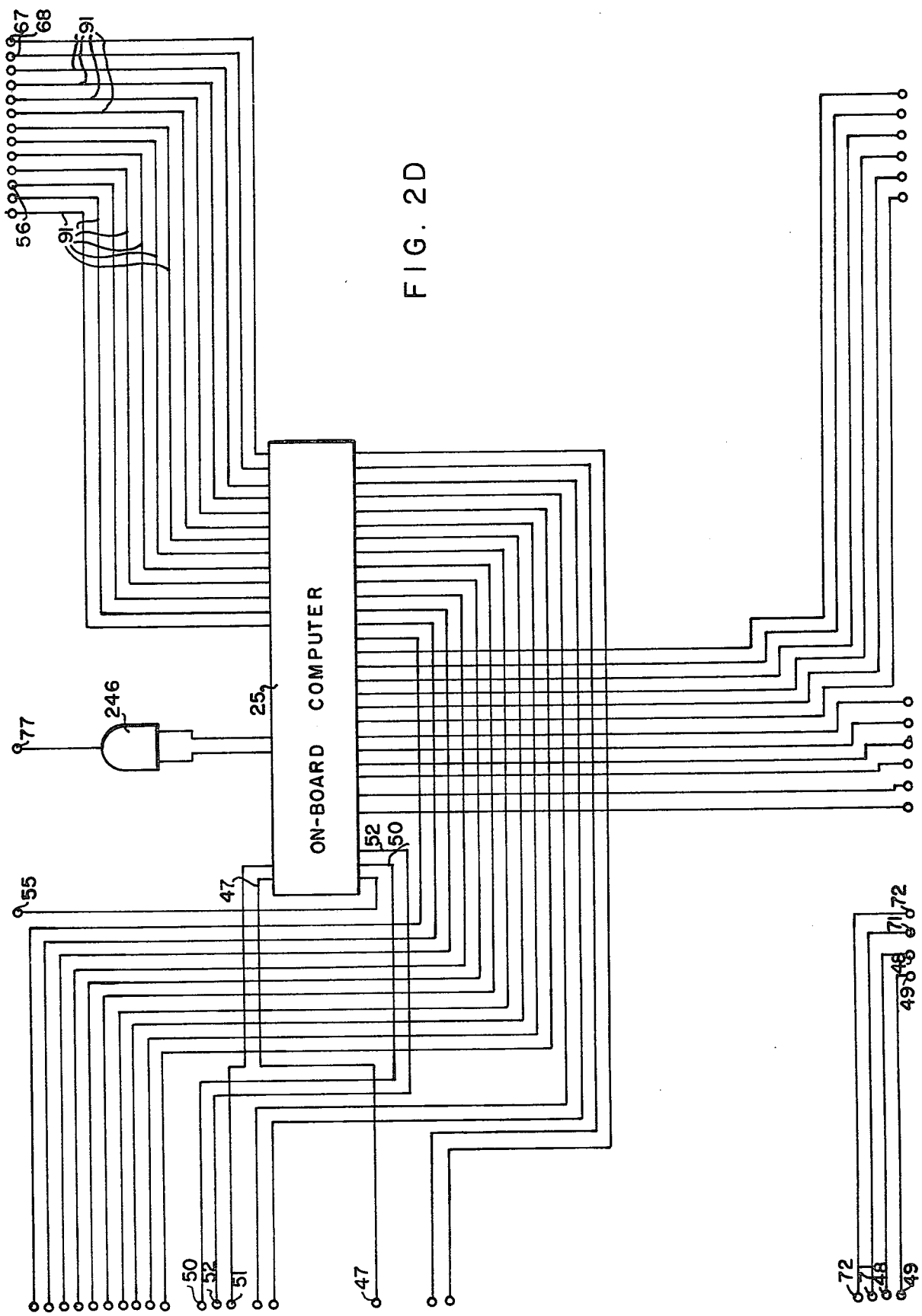

Lines 27 transmit bits 0-11 of word one which is a data word to the inputs of OR gates 101. Each of the above-mentioned bits are transmitted to a different OR gate. OR gates 101 are enabled and their outputs are transmitted (FIGS. 2B and 2C) to the inputs of a plurality of double four-to-one multiplexers. The OR gate portion of logic blocks 193-197 will only use the first 12 bits of words two to six. Bits 0-11 and bits 13-15 of word two are transmitted via line 32 to the input of logic block 193 (FIG. 2B). Bits 0-11 and bits 13-15 of word three are transmitted to the input of logic block 194 via line 34. Bits 0-11 and bits 13-15 of word four are transmitted to the input of logic block 195 via line 36. Word five is transmitted to the input of logic block 196 via line 38 and word six is transmitted to the input of logic block 197 via line 39. Bit 12 of word one is connected via line 28 (FIGS. 2A, 2F & 2G) to one of the inputs of OR gate 239, and the output of gate 239 is connected via line 78 (FIGS. 2G, 2H & 2E) to one of the inputs of multiplexer 231. Bit 12 of word two is connected via line 33 to one of the inputs of OR gate 241, and the output of gate 241 is connected via line 79 to one of the inputs of multiplexer 231. Line 35 transmits bit 12 of word three to one of the inputs of OR gate 243, and the output of gate 243 is connected via line 80 to one of the inputs of multiplexer 237. Line 37 transmits bit 12 of word four to one of the inputs of OR gate 245, and the output of gate 245 is connected via line 81 to one of the inputs of multiplexer 237. Computer 11 uses bit 12 to indicate the sign of the simulated data. The outputs of logic block 193-198 and OR gate 239, OR gate 241, OR gate 243 and OR gate 245 are coupled to the inputs of dual four-to-one multiplexers 225-237 (FIGS. 2C and 2D). Multiplexer 225 processes bits 0 and 1. Multiplexer 226 processes bits 2 and 3, multiplexer 227 processes bits 4 and 5, multiplexer 228 processes bits 6 and 7, multiplexer 229 processes bits 8 and 9, and multiplexer 230 processes bits 10 and 11 (FIG. 2C). Multiplexer 231 on FIG. 2E processes bits 12 and 13 and multiplexer 232 processes bits 14 and 15. Multiplexer 233 processes bits 16 and 17, multiplexer 234 processes bits 18 and 19, multiplexer 235 processes bits 20 and 21, multiplexer 236 processes bits 22 and 23, and multiplexer 237 processes bits 24 and 25. Multiplexers 225-237 rearrange the six 13-bit word parallel output of simulation computer 11 into three 26-bit serial words hereinafter called on-board computer words. On-board computer word one is a 26-bit word that is made up of bits 0-12 of simulation computer word one and bits 0-12 of simulation computer word two. On-board computer word two comprises bits 0-12 of word three and bits 0-12 of word four. Bits 0-12 of word five and bits 0-12 of word six combine into on-board computer word three. Thus, multiplexer 225 will combine bits 0 and 1 of simulation computer word one, three and five into bits 0 and 1 of on-board computer words one, two and three. Multiplexer 231 will combine bits 12 and 13 of simulation computer words one, three and five into bits 12 and 13 of on-board computer words one, two and three. Multiplexers 230-237 will process words two, four and six and multiplexers 225-231 (FIG. 2C) will process words one, three and five. The on-board computer words contain sin and cosine phase angle data for the 10.2, 11.33 and 13.6 kHz frequencies of the simulated Omega stations transmitting during that time period. The outputs of multiplexers 225-237 are coupled to on-board computer 25 on FIG. 2D. Whenever data is transferred to on-board computer 25, three 26-bit on-board computer words are word serially transferred from the multiplexers. Three on-board computer words will be transferred for each of the eight Omega stations. However, before each data burst (transfer of three on-board computer data words), a status word will be sent to the on-board computer 25. The generation of the status word is performed by the interface, not the simulation computer. However, only bits 0 and 1 of the status word are used which indicate to the on-board computer 25 (FIG. 2D) the status of the last 50 millisecond data burst. The generation of the status word is hereinafter described. On-board computer 25 (FIG. 2D) uses the information received from multiplexers 225-237 to compute the latitude and longitude of the simulated aircraft. This latitude and longitude calculation is accomplished by adding a delta figure determined from the sin and cosine phase angle data for the 10.2, 11.33 and 13.6 kHz frequencies to the previous location on the simulated aircraft. The original latitude and longitude entry may be entered when the simulated flight first begins since at that time the location of the aircraft is known or the original latitude and longitude entry may be determined from other navigational equipment and entered during flight.

Figure 2E:
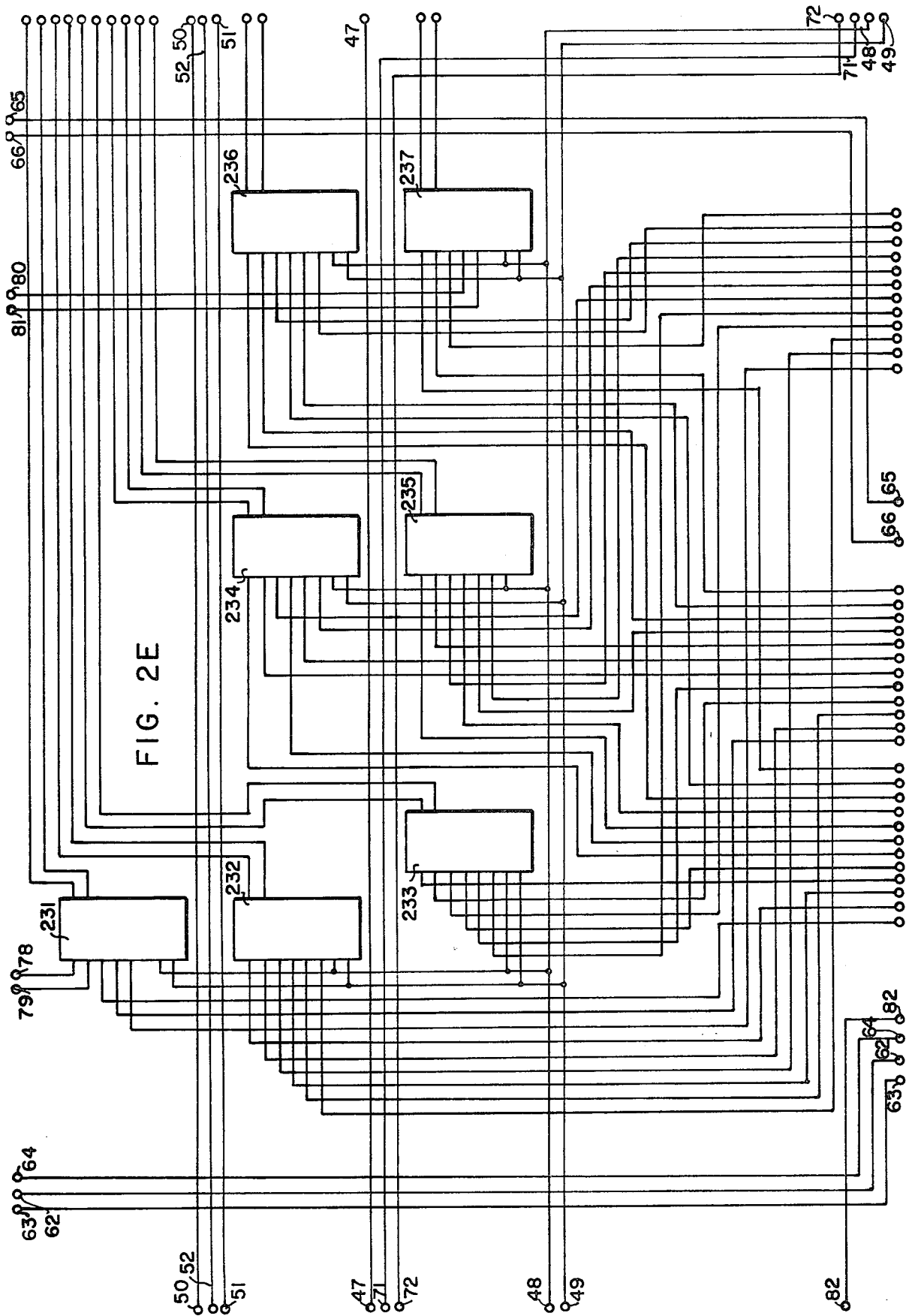
Figure 2F:
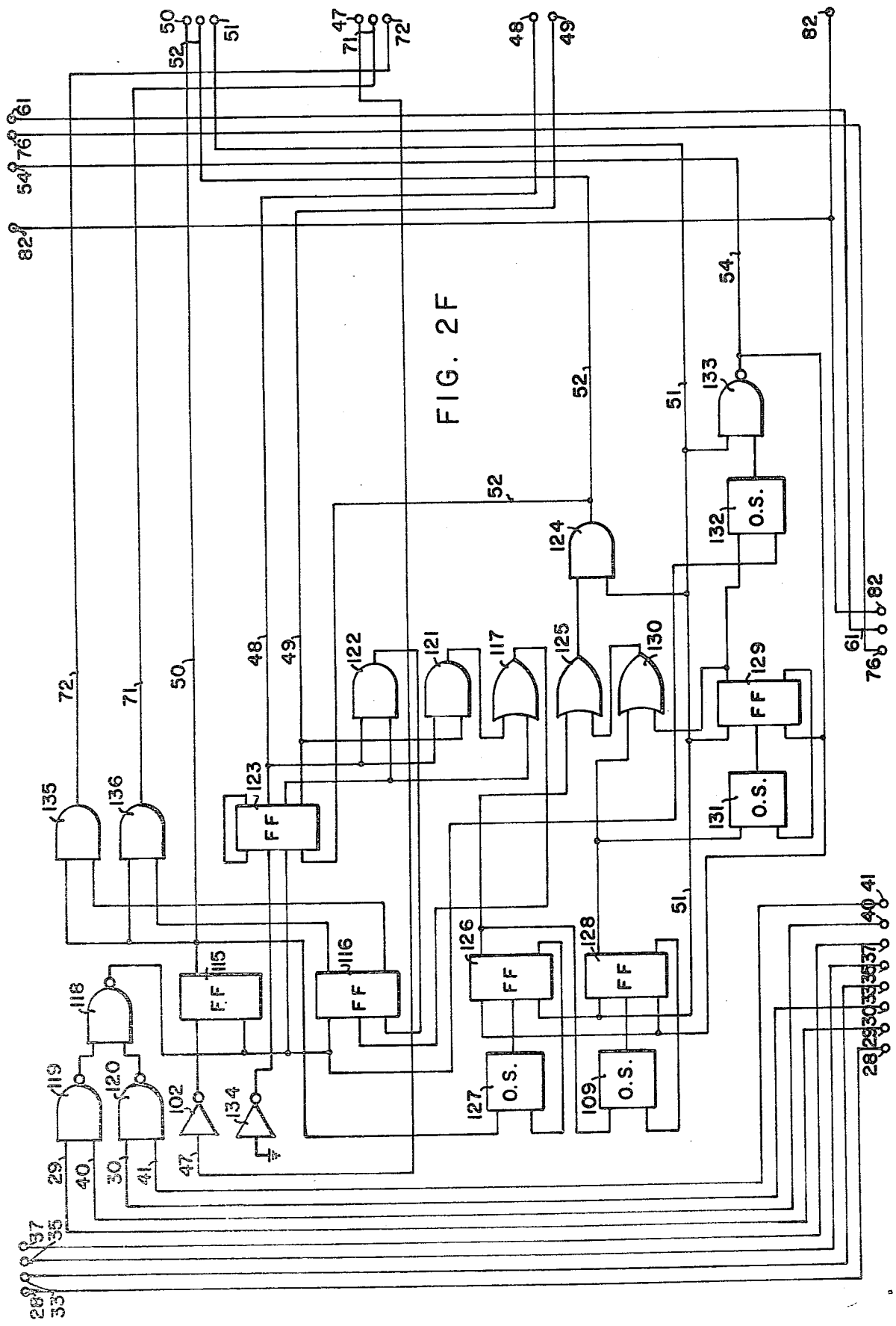
Figure 2G:
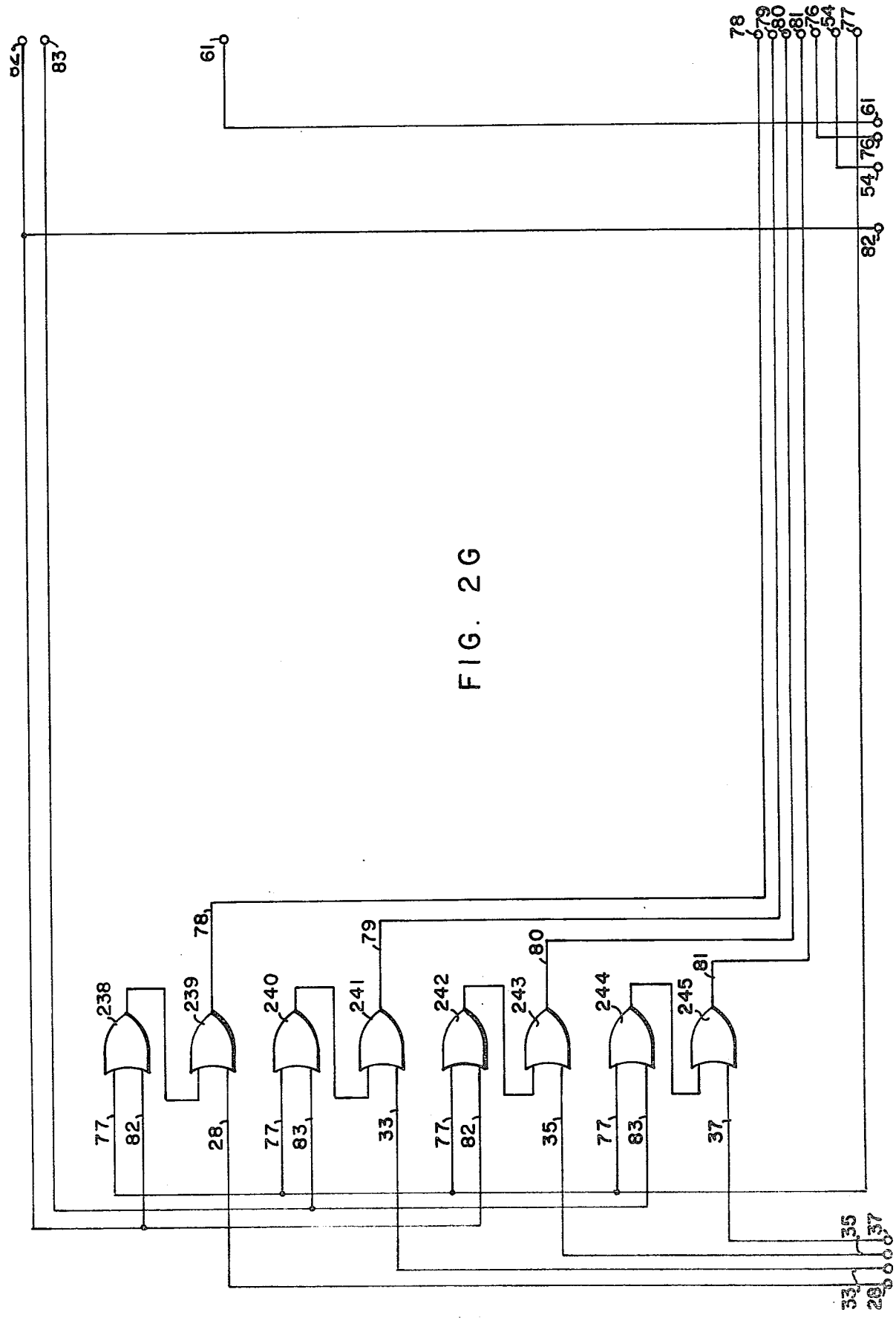

The three-word serial output of multiplexers 225-237 (FIGS. 2C and 2E) are transmitted to computer 25 (FIG. 2D) in a demand/request type of transfer. On-board computer 25 controls the foregoing transfer and informs this system when it wants the data words transferred. When on-board computer 25 (FIG. 2D) wishes to acquire data, computer 25 transmits a signal known as an external interrupt enable on line 47 (FIGS. 2D, 2E and 2F). The external interrupt enable signal is inverted by inverter 102 (FIG. 2F) and the output of inverter 102 causes the setting of flip flop 115. The output of flip flop 115 is a signal called an external input. The foregoing signal is transmitted to on-board computer 25 via line 50 (FIGS. 2F, 2E and 2D). On-board computer 25 must also receive the status of the last word transferred before it can acquire additional data. There are three possible alternatives for the last word status. They are: (1) all the data was sent to the on-board computer; (2) one of the words was missing; or (3) two of the words were missing. A 2-bit code is used to inform computer 25 of the status of the last word. Bit 0 and bit 1 of the first word transmitted (status word) to on-board computer contains the 2-bit status code. The status code is generated during the previous three data word transfer. Flip flop 116 (FIG. 2F) is used for storing the status of the last three data word transmissions to on-board computer 25. This is accomplished by triggering flip flop 116 every time a data word is transmitted to computer 25 during the last transmission period. The two inputs to NAND gate 119 are word one, bit 14, which is transmitted from computer 11 (FIG. 2A) via line 29 and word six, bit 14, which is transmitted from computer 11 via line 40. The two inputs to NAND gate 120 are word one, bit 15, which is transmitted from computer 11 via line 30 and word six, bit 15, which is transmitted from computer 11 via line 41. Thus, NAND gates 119 and 120 will be enabled from computer 11 in such a way that all six words will be transmitted by computer 11. NAND gate 118 has two inputs which are the outputs of gates 119 and 120. The output of gate 118 is a clock pulse that is coupled to flip flops 116, 115 and 123.

The status of the last word previously transferred is generated by AND gates 121 and 122 and OR gate 117. The output combination of the foregoing gates is a binary code from 0 to 3 that is applied to the inputs of flip flop 116. The code will remain at the inputs of flip flop 116 until NAND gate 118 is enabled. Gate 118 will be enabled when the six data words from simulation computer 11 have been fully up-dated. At this time, the inputs to flip flop 116 will be strobed to the output of flip flop 116. The outputs of flip flop 116 are coupled to the inputs of AND gates 135 and 136. The outputs of flip flop 116 will remain at the inputs of AND gates 135 and 136 until computer 25 generates an external interrupt enable signal which is transmitted via line 47. Inverter 102 will invert the external interrupt enable signal causing flip flop 115 to be enabled. The output of flip flop 115 is coupled to the inputs of AND gates 135 and 136. At this time, AND gates 135 and 136 will have at their outputs the status of the previously transmitted three word data burst. The outputs of AND gates 135 and 136 will be transmitted via lines 71 and 72 to on-board computer 25 after passing through multiplexer 225 on FIG. 2C. The output of gate 136 will be data bit 0 and the output of gate 135 will be data bit 1.

Flip flop 123 is a 2-bit binary counter and is cleared by the output of gate 118. The input to inverter 134 is coupled to ground and the output of inverter 134 is coupled to the input of flip flop 123 to insure that flip flop 123 will act on its clock input. Every time flip flop 123 receives a clock signal via line 52 called an input data request (next data word transferred to computer 25) from AND gate 124, flip flop 123 is incremented by a count of one. The outputs of flip flop 123 via lines 48 & 49 are used to select the proper output word at multipliers 225–237.

Figure 2I:
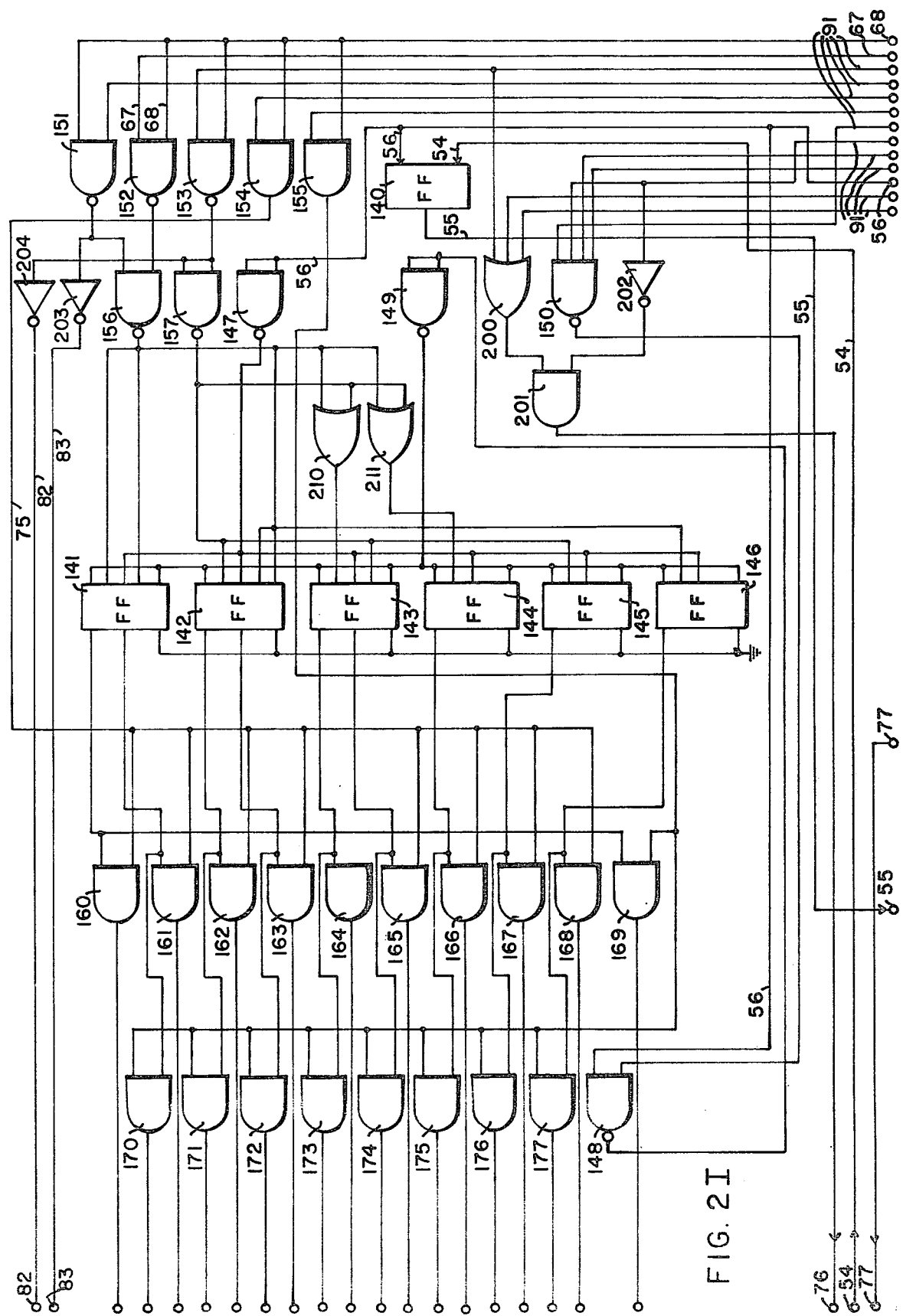

The generation of an input data request is accomplished as follows. On-board computer 25 (FIGS. 2D) generates a signal called an input acknowledge, the signal being transmitted to one of the inputs of AND gate 124 via line 51 (FIGS. 2D, 2E & 2F). The second input to gate 124 is the output of OR gate 125. OR gate 125 will be enabled by the output of flip flop 126. In order to insure that gate 125 is enabled at the proper time, the output of one-shot 127 is coupled to the input of flip flop 126. The output of flip flop 115 (external interrupt enable) will cause the triggering of one-shot 127. Thus, one-shot 127 will be triggered by the external input enable signal. If computer 25 generates an input acknowledge on line 51 before the time of one-shot 127 is up, flip flop 126 will be set, which in turn will clear one-shot 127 and activate one-shot 109. Flip flop 126 will enable OR gate 125. The output of OR gate 125 is coupled to AND gate 124. Coincidence of the two input signals at AND gate 124 will cause an input data request signal to be transmitted to on-board computer 25 via line 52 (FIGS. 2F, 2E and 2D). The input data request will also be transmitted via line 52 to the clock input of flip flop 123. Computer 25 receives the input data request and notes that the first data word is sitting at the outputs of multiplexers 225–237 (FIGS. 2C and 2E). Computer 25 accepts the word and generates an input acknowledge signal via line 51. If one-shot 109 has not been reset (one-shot 109 is used to insure that an input acknowledge signal is received within the maximum time limitation), the input acknowledge will trigger flip flop 128, resetting one-shot 109, and enabling one-shot 131, OR gate 130 and OR gate 125. This causes the output of AND gate 124 to generate an input data request for the next word which is transmitted on line 52 as long as the input acknowledge is present at the input to AND gate 124, computer 25 receives the second input data request and data word. After computer 25 receives the data word, it sets the input acknowledge line 51. If one-shot 131 has not been reset, the input acknowledge sets the output of flip flop 129 whose output resets one-shot 131, sets one-shot 132, and enables OR gate 130. The output of OR gate 130 enables OR gate 125. The output of OR gate 125, along with the input acknowledge signal, enables AND gate 124, causing the generation of the third input data request and the placing of the third data word at the output of multiplexers 225–237. Computer 25 generates the input acknowledge. If one-shot 132 has not been reset, the output of NAND gate 133 goes low with the arrival of an input acknowledge signal via line 51, causing the clearing of flip flops 126, 128, 129 and the setting of flip flop 140 (FIG. 2I). The output of flip flop 140 is a signal called an external function request which is transmitted to computer 25 via line 55.

As soon as all data has been transferred by the interface to computer 25, NAND gate 133 is enabled. The output of gate 133 sets flip flop 140 via line 54 (FIGS. 2F, 2G, 2H and 2I). The output of flip flop 140 (FIG. 2I) is transmitted to computer 25 via line 55. An external function request signal signifies to on-board computer 25 that this system has sent all the incoming data it has from the Omega stations (simulation computer 11) and it is waiting for another command to send more data or a command to send test information. The Omega receiver in the real world may alter the phase angle data that is received from the stations. Therefore, tests are performed on the receiver to insure that the data received by on-board computer 25 has not been altered by the receiver circuitry. Since the actual receiver does not exist in the simulation system, the simulation interface 15 is responsible for responding to computer 25 test requests. After computer 25 receives a burst of data, it normally wishes to check the interface during the simulated Omega stations' non-transmission period. When on-board computer 25 is ready to transmit test data, it generates a signal called an external function. The external function signal is transmitted via line 56 (FIGS. 2D and 2I) in order to clear flip flop 140, removing the external request signal. At this time, this system wants to process the test data that is on computer 25 data lines 91. Flip flops 141–146 (FIG. 2I) are used for holding the test data which comes from the data lines of computer 25. This data is stored in flip flops 141–146 for the reason that the data will not be on the data lines during the entire period of time that it is needed by this system. Before data may be loaded into flip flops 141–146, the flip flops must be cleared. NAND gates 148 and 149 will be used for clearing the aforementioned flip flops. The four inputs to NAND gate 150 come from computer 25. These inputs determine which one of the three frequencies the test is going to be performed on, or whether the test is a diagnostic test. If computer 25 is not asking for one of these tests (normally not) when the external function is received from computer 25 over line 56, the output of gate 150 is a high signal that is coupled to one of the inputs of NAND 148. When the external function which is currently a negative logic level returns to its off state which is a high logic level, the output of gate 148 will be set low, causing the output of NAND gate 149 to clear flip flops 141–146. Computer 25 will inform this system of the tests it wishes to be performed by sending a coded signal on data lines 91. The foregoing code will be decoded by gates 151–157. The coded signal will signify that one of the following tests is to be performed: an up count test, a down count test, a phase-to-digital test, a calibration test, and a calibration + 90 test, which tests will hereinafter be described. Flip flops 141–146 will store the code of the type of test computer 25 wishes to run. The foregoing code is used to output a series of digitally coded pulses to computer 25 so that computer 25 can insure that this system is operating properly. Computer 25 takes the number of pulses that it receives and averages the reading over 20 passes. Each time a test command in sent by computer 25, this system deciphers the test command and transfers to computer 25 a string of pulses. This is accomplished by taking the output of flip flops 141–146 and having AND gates 160–177 decode this information. The decoded information will be representative of the particular test being requested by computer 25. The outputs of AND gates 160–177 are coupled to the inputs of 12 synchronous 6-bit binary rate multipliers 212–223 (FIG. 2H). Multipliers 212 and 213, 214 and 215, 216 and 217, 218 and 219, 220 and 221, 222 and 223 are cascaded together. The foregoing outputs from the multipliers are from the second multiplier of each multiplier pair. Thus, there will be two rate multipliers per word of data. The six outputs of multipliers 212–223 will represent the sin and cosine for the 10.2, 11.33 and 13.6 kHz frequency signals. The output of multiplier 213 is coupled to the input of divide-by-1000 divider 186. Divider 186 will process the sin of 10.2 kHz signal. The output of multiplier 215 is coupled to the input of divider 187. Divider 187 will process the cosine of 10.2 kHz signal. The input of divider 188 is connected to the output of multiplier 217. Divider 188 processes the sin of the 11.33 kHz signal. The output of multiplier 217 is coupled to the input of divider 189, whose output represents the cosine of the 11.33 kHz frequency, and the output of multiplier 219 is coupled to the input of divider 190, whose output represents the sin of 13.6 kHz frequency. The input of divider 191 is the output of multiplier 223. Divider 191 processes the cosine of 13.6 kHz signal. Multipliers 212–223 are used to produce the frequency of the pulse stream commanded by AND gates 160–177. The output of divider 186 is transmitted via line 61 (FIGS. 2G, 2F and 2A) to the input of up-down counter 192, and the output of divider 187 is transmitted via line 62 (FIGS. 2H, 2E and 2B) to the input of logic block 194. The output of divider 188 is transmitted via line 63 to the input of logic block 195, the output of divider 189 is transmitted via line 64 to the input of logic block 193, and the output of divider 190 is coupled to the input of logic block 196 via line 65. The output of divider 191 is coupled to the input of logic block 197 via line 66. The up-down counter portion of logic block 193–198 are used for loading on-board computer 25 with a number that is relative to the pulse count of the test that is currently being run.

One of the tests requested by computer 25 is a phase up count test. Every 50 milliseconds computer 25 expects this system's counters to count 157.85 counts. The counts are summed over 20 passes. At the conclusion of the 20 passes, the total count should be 3,157 counts plus or minus one count. If the count is between 3,156–3,158 this system has passed the phase up count test.

When the up count test is requested by on-board computer 25, computer 25 will cause lines 67 and 68 to be set high, causing a low signal at the output of NAND gate 152 (FIG. 2I) and at one of the inputs of NAND gate 156. At this time, the other input of gate 156 will be high, causing the output of gate 156 to go from a low state to a high state. The output of gate 156 is coupled to the input of flip flop 141, OR gate 210, OR gate 211 and flip flops 142 and 146. The output of OR gate 210 is coupled to the input of flip flop 143 and the output of OR gate 211 is coupled to the input of flip flop 144. The inputs of flip flops 141–146 are transferred to the outputs of the flip flops after computer 25 transmits an external function signal via line 56. That signal passes through NAND gate 147 and arrives at the inputs of flip flops 141–146. At this moment, the following digital code 110010101 will appear at the output lines of flip flops 141–146. Each of flip flops 141–146 is actually two flip flops. The outputs of flip flops 141–146 are coupled to the inputs of AND gates 160–177. AND gates 160–169 are used to enable the computer 25 requested calibration test function. If a calibration test is requested, computer 25 will cause AND gate 154 to have a high output, causing the outputs of flip flops 141–146 to be gated through AND gates 160–169 to the inputs of rate multipliers 212–223. If a calibration + 90 is requested, flip flops 141–146 will be gated through AND gates 170–177 to the multipliers 212–223 when the enable pulse from AND gate 155 goes high.

Clock 275 (FIG. 2H) generates a four megahertz clock pulse which is inverted by inverter 276. The output of inverter 276 is transmitted to the inputs of multipliers 212–223 via line 70. When multipliers 212 and 213 receive the clock signal from clock 275, the output of multiplier 213 will be a 3.15712 megahertz signal. The outputs of multipliers 213, 215, 217, 219, 221 and 223 are determined by the following formula: binary code times the frequency of the clock pulse divided by 4,096. The output of multiplier 213 is coupled to the input of divide-by-1000 divider 186. The output of divider 186 will be a pulse train having a frequency of 3,157 pulses per second. The pulse is transmitted to the input of up-down counter 192 via line 61 (FIGS. 2H, 2G, 2F and 2A).

The output of divider 187 is a pulse having a frequency of 3,157 pulses per second. This output is transmitted via line 62 (FIGS. 2F, 2E, 2B) to the input of logic block 193. The input of logic block 194 is a pulse that has a frequency of 3,157 pulses per second that is the output of divider 188 and is transmitted via line 63. The output of divider 189 is a pulse having a frequency of 3,157 pulses per second that is transmitted via line 64 to the input of logic block 195, and the output of divider 190 is a pulse having a frequency of 3,157 pulses per second that is transmitted via line 65 to the input of logic block 196. The output of divider 191 is a pulse having a frequency of 3,157 pulses per second that is transmitted to the input of logic block 197 via line 66. Up-down counter 192 and logic blocks 193–197 have a serial input which they convert to a parallel word output. Up-down counter 192 and the up-down counter portion of logic block 193 are enabled by the output of NAND gate 153 through inverted 204 via line 82 (FIGS. 2I, 2H, 2G, 2F and 2A) providing capability of up count or down count depending on test requirements. Before the outputs of OR gates 101 and logic blocks 193–197 are transmitted to the input of computer 25, the signals pass through multiplexers 225–237 in the same manner as data passes through the multiplexers which was previously described. The foregoing process continues for 20 passes and computer 25 sums the pulses and determines any deviation that may exist between any pass. If this system has not passed the phase up count test (that is, between any two passes there was too great a discrepancy), computer 25 will correct the latitude and longitude position of the aircraft by an appropriate amount.

Computer 25 may request the performance of additional tests in order to determine that this system is functioning properly. The same circuit that is used for the up count test is also used for the down count, phase-to-digital, calibration and calibration plus 90 degrees test. However, the frequency of the signal will be different. The frequency of the signal is determined by the above formula.

The down count test is used to insure that the counters count correctly in the negative direction. The phase-to-digital test is used to insure that the phase signal that is transmitted by each Omega station is correctly converted to a digital format. A calibration test is used to calibrate this system (receiver) and the calibration plus 90 degrees test insures that the sin and cosine signals are transmitted with a minimum phase shift. Each of the foregoing tests will have a different code. Therefore, flip flops 141–146 will have a different output.

During the testing of this system, the inputs of OR gate 200 (FIG. 2I) are the outputs of computer 25. Thus, OR gate 200 will be enabled if computer 25 requests the performance of any test. The output of gate 200 is connected to one of the inputs of AND gate 201. The second input to AND gate 201 is the output of inverter 202. The input of inverter 202 is connected to the output line of computer 25 which will always be low when the computer requests a test. The output of AND gate 201 is coupled to the input of computer 11 via line 76 (FIGS. 2I, 2H, 2G, 2F and 2A). When gate 201 is enabled, computer 11 will be inhibited and thus computer 11 will not transmit simulated Omega data.

The two inputs to AND gate 246 come from computer 25. When the inputs of gate 246 go high, the commanded test request from computer 25 will be inverted 180°, i.e., calibration test becomes calibration + 180°, calibration + 90° becomes calibration + 270°, and gate 246 will be enabled. The output of gate 246 is connected via line 77 (FIGS. 2D, 2I, 2H and 2G) to the inputs of OR gates 238, 240, 242 and 244. The output of gate 238 is connected to the input of OR gate 239 and the output of gate 239 is connected via line 78 (FIGS. 2G, 2H and 2E) to one of the inputs of multiplexer 231. The output of OR gate 240 is connected to the input of OR gate 241 and the output of gate 241 is connected via line 79 to one of the inputs of multiplexer 231. The output of multiplexer 231 is coupled to computer 25 (FIG. 2D) to signify that the incoming data words one, three and five will be negative in value and that the status coherence bit will be set to zero since there will be no change in the precision counter of the Omega receiver. The output of OR gate 242 is connected to the input of OR gate 243 and the output of gate 243 is connected via line 80 to one of the inputs of multiplexer 235. The output of multiplexer 235 is coupled to computer 25 to signify that the incoming data words two, four and six are negative in value. Inverters 203 and 204 (FIG. 2I) are used during the down count and phase-to-digital tests for setting the sign bit negative. If a down count test is requested by computer 25, NAND gate 151 will be enabled (low) and its output will be inverted by inverter 203. The output of inverter 203 is connected via line 83 (FIGS. 2H, 2I and 2G) to the inputs of OR gates 240 and 244. The output of OR gate 240 is connected to the input of OR gate 241 and the output of OR gate 241 is connected via line 79 to the input of multiplexer 231. The output of multiplexer 231 is connected to and causes computer 25 to set the sign bit of words one, three and five negative. The output of OR gate 244 is connected to the input of OR gate 245 and the output of gate 245 is connected via line 81 to the input of multiplexer 235. The output of multiplexer 235 is connected to computer 25 to set the sign bit negative. The foregoing is done so that computer 25 will realize that it is receiving negative numbers.

When a phase-to-digital test is requested by computer 25, NAND gate 153 will be enabled. The output of gate 153 will be inverted by inverter 209 and the output of inverter 209 is connected via line 82 to the input of OR gates 238 and 242. The output of OR gate 238 is connected to the input of OR gate 239 and the output of gate 239 is connected to multiplexer 231 via line 78. The output of OR gate 242 is connected to the input of OR gate 243 and the output of OR gate 243 is connected via line 80 to the input of multiplexer 235. The outputs of multiplexers 231 and 235 are coupled to computer 25 and cause computer 25 to set the sign bit negative to permit this system to undergo a phase-to-digital test.

The above specification describes a new and improved Omega navigation training system which may be used to instruct students in the operation of Omega equipment. It is realized that the above description may indicate to those skilled in the art additional ways in which the principles of this invention may be used without departing from its spirit. It is, therefore, intended that this invention be limited only by the scope of the appended claims.

What is claimed is:

1. An Omega navigation training system designed to indicate to an operator the position of a simulated vehicle which receives transmissions from simulated Omega stations, said system comprising:

a. a simulation computer that contains an Omega simulation program generating a plurality of Omega stations, and the functions of the Omega receiver;

b. an Omega interface coupled to said simulation computer for formatting the outputs of said simulation computer; and c. an on-board computer coupled to said Omega interface, said on-board computer processes the formatted simulated Omega navigation information received from said Omega interface and displays said information in the form of updated geographical position of said simulated vehicle.

2. The system according to claim 1 further including a multipurpose display having a keyboard coupled to said on-board computer whereby an operator may enter information into said on-board computer.

3. A simulated Omega interface that receives simulated Omega signals from a simulation computer and processes and transmits said simulated Omega navigational signals to an on-board computer, said system comprising:

a. a plurality of multiplexers for multiplexing the signal generated by said simulation computer;

b. an on-board computer coupled to said multiplexers for processing the simulated information; and c. timing means coupled to said multiplexers and said on-board computer for controlling the time and transfer of simulated Omega data from said multiplexers to said on-board computer.

4. The system according to claim 3 further including means for testing the accuracy of said Omega interface.

5. The system according to claim 4 wherein said testing means comprises:

a. a first plurality of gates for storing the type of test requested by said on-board computer;

b. a plurality of flip flops coupled to the output of said gates for storing the code of the test requested by said on-board computer;

c. means for enabling said flip flops coupled to the inputs of said flip flops so that said flip flops will be enabled at a certain specified time;

d. a second plurality of gates coupled to the output of said enabling means for processing said code;

e. a plurality of rate multipliers whose inputs are coupled to the outputs of said second gates so that the outputs of said multipliers will be a pulse train having a certain frequency dependent upon the code stored in said flip flops;

f. clock means having a constant frequency coupled to the input of said multipliers for clocking said multipliers;

g. a plurality of dividers coupled to the output of said multipliers for reducing the frequency of said pulse train; and h. a plurality of up-down counters coupled to the output of said dividers, said counters converting said pulse train serial input into a parallel word output which is coupled to the input of said multiplexers whereby the output of said multipliers is a frequency having a certain specified value which is used by said on-board computer for checking any deviation that may exist in said system.

6. A system for simulating an Omega navigation system whch includes a plurality of simulated Omega transmitters each with a different pulse recurrence rate from the others and covering a wide geographical area, said simulation system comprising:

a. a digital simulation computer for digitally generating the pulses that are produced by a plurality of Omega transmitters;

b. an Omega interface that receives navigational signals from said simulation computer, said interface processing the positional data received from said simulation computer; and c. an on-board computer whose input is coupled to said interface and whose output displays the location of the vehicle whose journey is being simulated.

* * * * *